United States Patent
Inoue

(10) Patent No.: US 12,164,629 B2
(45) Date of Patent: Dec. 10, 2024

(54) VEHICLE-MOUNTED COMMUNICATION SYSTEM, DETERMINATION DEVICE, COMMUNICATION DEVICE, DETERMINATION METHOD, AND COMPUTER PROGRAM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Masayuki Inoue, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 1053 days.

(21) Appl. No.: 17/044,433

(22) PCT Filed: May 13, 2019

(86) PCT No.: PCT/JP2019/018886
§ 371 (c)(1),
(2) Date: Oct. 1, 2020

(87) PCT Pub. No.: WO2019/225369
PCT Pub. Date: Nov. 28, 2019

(65) Prior Publication Data
US 2021/0034744 A1    Feb. 4, 2021

(30) Foreign Application Priority Data
May 21, 2018    (JP) ................................ 2018-097388

(51) Int. Cl.
*G06F 21/55* (2013.01)
*B60R 16/023* (2006.01)
(Continued)

(52) U.S. Cl.
CPC ........ *G06F 21/554* (2013.01); *B60R 16/0232* (2013.01); *G06F 21/44* (2013.01);
(Continued)

(58) Field of Classification Search
None
See application file for complete search history.

(56) References Cited

U.S. PATENT DOCUMENTS

2004/0260435 A1 * 12/2004 Jung .................. G05B 23/0235
                                                                    701/1
2011/0130110 A1    6/2011 Aida et al.
(Continued)

FOREIGN PATENT DOCUMENTS

JP    2004-064414 A    2/2004
JP    2016-086256 A    5/2016
(Continued)

OTHER PUBLICATIONS

International Search Report, Application No. PCT/JP2019/018886, mailed Jun. 4, 2019. ISA/Japan Patent Office.

*Primary Examiner* — Christopher C Harris
(74) *Attorney, Agent, or Firm* — Honigman LLP

(57) ABSTRACT

A vehicle-mounted communication system in which a plurality of communication devices and a determination device for determining an abnormality regarding the communication devices are connected to each other via a bus, wherein the determination device includes: a transmitting unit that transmits a determination signal at a predetermined voltage to each of the communication devices; and a determination unit that determines the abnormality based on a response signal transmitted from each of the communication devices in response to the determination signal, each of the communication devices includes: a signal output unit that outputs a first logical value signal based on a unique voltage threshold, in response to a determination signal that is (Continued)

received; and a generating unit that generates a second logical value signal based on the first logical value signal, and the signal output unit outputs the response signal to the bus based on the second logical value signal.

17 Claims, 8 Drawing Sheets

(51) Int. Cl.
*G06F 21/44* (2013.01)
*H04L 12/40* (2006.01)
(52) U.S. Cl.
CPC ........ *H04L 12/40* (2013.01); *G06F 2221/034* (2013.01); *H04L 2012/40273* (2013.01)

(56) References Cited

U.S. PATENT DOCUMENTS

| | | | |
|---|---|---|---|
| 2017/0153282 A1* | 6/2017 | Du | G01R 31/007 |
| 2018/0041240 A1 | 2/2018 | Tsuchiya et al. | |
| 2018/0091550 A1* | 3/2018 | Cho | H04L 5/0055 |
| 2018/0270195 A1* | 9/2018 | Bathurst | H04L 63/0209 |
| 2019/0385057 A1* | 12/2019 | Litichever | H04L 63/14 |

FOREIGN PATENT DOCUMENTS

| | | |
|---|---|---|
| JP | 2016-111477 A | 6/2016 |
| JP | 2016-151871 A | 8/2016 |

* cited by examiner

FIG. 5

| ECU ID | Determination signal | Voltage pattern |
|---|---|---|
| 1 | T1 | X11 |
|   | T2 | X12 |
|   | T3 | X13 |
| 2 | T1 | X21 |
|   | T2 | X22 |
|   | T3 | X23 |
| 3 | T1 | X31 |
|   | T2 | X32 |
|   | T3 | X33 |
| 4 | T1 | X31 |
|   | T2 | X32 |
|   | T3 | X33 |

VEHICLE-MOUNTED COMMUNICATION SYSTEM, DETERMINATION DEVICE, COMMUNICATION DEVICE, DETERMINATION METHOD, AND COMPUTER PROGRAM

CROSS-REFERENCE TO RELATED APPLICATIONS

This application is the U.S. national stage of PCT/JP2019/018886 filed on May 13, 2019, which claims priority of Japanese Patent Application No. JP 2018-097388 filed on May 21, 2018, the contents of which are incorporated herein.

TECHNICAL FIELD

The present disclosure relates to a vehicle-mounted communication system, a determination device, a communication device, a determination method, and a computer program related to a vehicle.

BACKGROUND

Conventionally, there are known methods for detecting unauthorized ECUs or the like connected to vehicle networks.

JP 2016-151871A discloses a vehicle-mounted system for detecting unauthorized devices connected to a vehicle-mounted network, by generating pseudorandom numbers based on secret information stored in ECUs, transmitting determination data generated based on the random numbers between the ECUs, and causing an ECU that has received determination data to determine whether or not the received determination data was transmitted from an authorized ECU through verification of the data.

The vehicle-mounted system of JP 2016-151871A is problematic in that it is necessary to store secret information in each ECU in order to generate determination data, and the secret information has to be properly protected from threats such as leakage or falsification by a malicious third party.

It is an object of the present disclosure to provide a vehicle-mounted communication system, a determination device, a communication device, a determination method, and a computer program with which, in a vehicle-mounted communication system including a plurality of communication devices, abnormalities regarding the communication devices can be determined without using secret information.

SUMMARY

An aspect of the present disclosure is directed to a vehicle-mounted communication system in which a plurality of communication devices and a determination device for determining an abnormality regarding the communication devices are connected to each other via a bus, wherein the determination device includes: a transmitting unit that transmits a determination signal at a predetermined voltage to each of the communication devices; and a determination unit that determines the abnormality based on a response signal transmitted from each of the communication devices in response to the determination signal, each of the communication devices includes: a signal output unit that outputs a first logical value signal based on a unique voltage threshold, in response to a determination signal that is received; and a generating unit that generates a second logical value signal based on the first logical value signal, and the signal output unit outputs the response signal to the bus based on the second logical value signal.

An aspect of the present disclosure is directed to a determination device that can be connected to a plurality of communication devices via a bus, and is configured to determine an abnormality regarding the communication devices, including: a transmitting unit that transmits a determination signal at a predetermined voltage to each of the communication devices, wherein each of the communication devices outputs a logical value signal based on a unique voltage threshold, in response to a determination signal that is received, and outputs a response signal to the bus based on the logical value signal, and the determination device further includes a determination unit that determines the abnormality based on the response signal output from each of the communication devices in response to the determination signal.

An aspect of the present disclosure is directed to a communication device that can be connected via a bus to an external device that outputs a determination signal at a predetermined voltage, including: a signal output unit that receives the determination signal, and outputs a first logical value signal based on a unique voltage threshold; and a generating unit that generates a second logical value signal based on the first logical value signal, wherein the signal output unit outputs a response signal that is used by the external device to determine an abnormality regarding the communication device, to the bus, based on the second logical value signal.

An aspect of the present disclosure is directed to a determination method that is performed by a determination device that can be connected to a plurality of communication devices via a bus, and is configured to determine an abnormality regarding the communication devices, the method for performing the determination, including: transmitting a determination signal at a predetermined voltage to each of the communication devices; and determining the abnormality based on a response signal output based on a logical value signal output using a unique voltage threshold by each of the communication devices that have received the determination signal.

An aspect of the present disclosure is directed to a computer program for causing a computer connected to a plurality of communication devices via a bus, and configured to determine an abnormality regarding the communication devices, to execute processing of transmitting a determination signal at a predetermined voltage to each of the communication devices; receiving a response signal output based on a logical value signal output using a unique voltage threshold by each of the communication devices that have received the determination signal; and determining the abnormality based on the received response signal.

Advantageous Effects of the Present Disclosure

According to an aspect of the present disclosure, in a vehicle-mounted communication system including a plurality of communication devices, it is possible to determine abnormalities regarding the communication devices, without using secret information.

BRIEF DESCRIPTION OF DRAWINGS

FIG. 5 is a conceptual diagram conceptually showing a LUT stored in a storage unit in the vehicle-mounted communication system according to this embodiment.

DETAILED DESCRIPTION OF PREFERRED EMBODIMENTS

Figure 1:
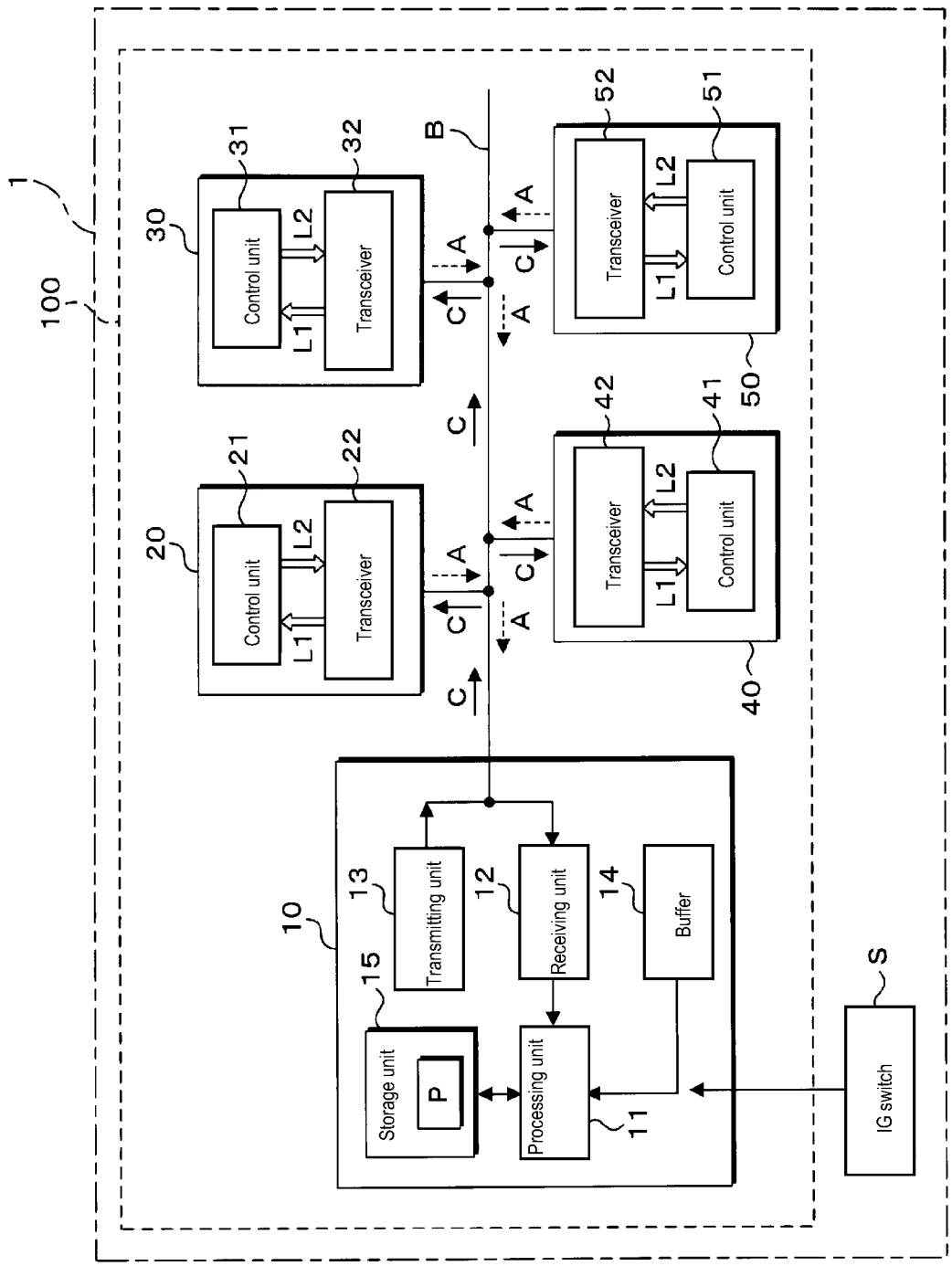
FIG. 1 is a block diagram showing the configuration of a vehicle-mounted communication system according to this embodiment.

First, embodiments of the present disclosure will be listed and described. Note that at least some of the embodiments described below may be freely combined.

An aspect of the present disclosure is directed to a vehicle-mounted communication system in which a plurality of communication devices and a determination device for determining an abnormality regarding the communication devices are connected to each other via a bus, wherein the determination device includes: a transmitting unit that transmits a determination signal at a predetermined voltage to each of the communication devices; and a determination unit that determines the abnormality based on a response signal transmitted from each of the communication devices in response to the determination signal, each of the communication devices includes: a signal output unit that outputs a first logical value signal based on a unique voltage threshold, in response to a determination signal that is received; and a generating unit that generates a second logical value signal based on the first logical value signal, and the signal output unit outputs the response signal to the bus based on the second logical value signal.

According to this aspect, the determination device transmits a determination signal at a predetermined voltage to each of the communication devices. Each of the communication devices outputs a first logical value signal based on a unique voltage threshold, in response to a determination signal that is received, generates a second logical value signal based on the first logical value signal, and outputs the response signal based on the second logical value signal. The determination device determines the abnormality based on the response signal transmitted from each of the communication devices.

Since each communication device outputs a response signal that is different from that of other communication devices according to a unique voltage threshold of the communication device, the determination device can determine abnormalities regarding the communication device based on the response signal.

An aspect of the present disclosure is directed to the vehicle-mounted communication system, wherein the first logical value signal and the second logical value signal are signals indicating the same logical value.

According to this aspect, the first logical value signal and the second logical value signal are signals indicating the same logical value, and the response signal is output based on the second logical value.

Accordingly, it is easy to generate a second logical value signal related to the response signal, without special processing in preparation therefor.

An aspect of the present disclosure is directed to the vehicle-mounted communication system, further including a storage unit in which the determination signal, identification data of each of the communication devices, and a predetermined voltage pattern are stored in association with each other, wherein the determination unit performs the determination based on storage content of the storage unit.

According to this aspect, if a response signal is transmitted from each of the communication devices in response to the determination signal, the determination unit performs the determination by comparing the storage content of the storage unit with the transmitted response signal.

Accordingly, it is possible to accurately determine abnormalities regarding the communication devices, without using secret information.

An aspect of the present disclosure is directed to the vehicle-mounted communication system, wherein the signal output unit outputs a response signal containing identification data of the communication device to which it belongs, and the determination unit determines that there is an abnormality, if a voltage pattern of any of the response signals that are transmitted in response to one determination signal does not match the voltage pattern stored in the storage unit in association with the one determination signal.

According to this aspect, for example, if a plurality of response signals are transmitted in response to a predetermined determination signal, a comparison is performed as to whether or not a voltage pattern of any of the response signals does not match a voltage pattern corresponding to the predetermined determination signal, stored in the storage unit.

As a result of this comparison, if a voltage pattern of any response signal does not match a voltage pattern stored in the storage unit, it is possible to determine that there is an abnormality in the communication device that transmitted the non-matching voltage pattern (response signal).

An aspect of the present disclosure is directed to the vehicle-mounted communication system, wherein the determination unit determines that a communication device from which the non-matching response signal was output has been replaced, if the number of non-matching response signals with the voltage patterns not being matched is less than a threshold.

According to this aspect, if the number of non-matching response signals with the voltage patterns not being matched is less than a threshold, it is determined that there is an abnormality in part of the plurality of communication devices connected to the determination device, and the determination unit determines that a communication device from which the non-matching response signal was output has been replaced.

Accordingly, if there is an abnormality regarding the communication devices, it is possible to clarify the cause of the abnormality.

An aspect of the present disclosure is directed to the vehicle-mounted communication system, wherein the determination unit determines that part of the communication devices has been detached from the bus or that a new communication device has been connected to the bus, if the number of non-matching response signals with the voltage patterns not being matched is more than or equal to a threshold.

According to this aspect, if the number of non-matching response signals with the voltage patterns not being matched is more than or equal to a threshold, it is determined that there is an abnormality in the whole of the plurality of communication devices connected to the determination device, and the determination unit determines that part of the communication devices has been detached from the bus or that a new communication device has been connected to the bus.

Accordingly, if there is an abnormality regarding the communication devices, it is possible to clarify the cause of the abnormality.

An aspect of the present disclosure is directed to the vehicle-mounted communication system, wherein the voltage threshold is 0.5 V or more and 0.9 V or less, and the determination signal contains a voltage that is 0.5 V or more and 0.9 V or less.

According to this aspect, each of the communication devices has a unique voltage threshold at 0.5 V or more and 0.9 V or less, and the determination signal contains a voltage that is 0.5 V or more and 0.9 V or less.

Accordingly, for a voltage that is 0.5 V or more and 0.9 V or less contained in the determination signal, each communication device determines a logical value that is different from that of other communication devices, and outputs a response signal that is different from that of other communication devices, and thus it is possible to determine abnormalities regarding the communication device.

An aspect of the present disclosure is directed to the vehicle-mounted communication system, wherein the determination signal further contains a voltage that is higher than 0.9 V.

According to this aspect, each of the communication devices has a unique voltage threshold at 0.5 V or more and 0.9 V or less, and the determination signal contains a voltage that is 0.5 V or more and 0.9 V or less, and a voltage that is higher than 0.9 V.

Accordingly, for a voltage that is 0.5 V or more and 0.9 V or less contained in the determination signal, each communication device determines a logical value that is different from that of other communication devices, and outputs a response signal that is different from that of other communication devices, and thus it is possible to determine abnormalities regarding the communication device.

An aspect of the present disclosure is directed to the vehicle-mounted communication system, wherein the determination signal further contains a voltage that is lower than 0.5 V.

According to this aspect, each of the communication devices has a unique voltage threshold at 0.5 V or more and 0.9 V or less, and the determination signal contains a voltage that is 0.5 V or more and 0.9 V or less and a voltage that is lower than 0.5 V.

Accordingly, for a voltage that is 0.5 V or more and 0.9 V or less contained in the determination signal, each communication device determines a logical value that is different from that of other communication devices, and outputs a response signal that is different from that of other communication devices, and thus it is possible to determine abnormalities regarding the communication device.

An aspect of the present disclosure is directed to the vehicle-mounted communication system, wherein the determination signal further contains a voltage that is higher than 0.9 V and a voltage that is lower than 0.5 V.

According to this aspect, each of the communication devices has a unique voltage threshold at 0.5 V or more and 0.9 V or less, and the determination signal contains a voltage that is 0.5 V or more and 0.9 V or less, a voltage that is higher than 0.9 V, and a voltage that is lower than 0.5 V.

Accordingly, for a voltage that is 0.5 V or more and 0.9 V or less contained in the determination signal, each communication device determines a logical value that is different from that of other communication devices, and outputs a response signal that is different from that of other communication devices, and thus it is possible to determine abnormalities regarding the communication device.

An aspect of the present disclosure is directed to the vehicle-mounted communication system, wherein the determination unit performs the determination after a vehicle stops and before the vehicle starts to move.

According to this aspect, the determination unit determines an abnormality regarding the communication devices after a vehicle stops and before the vehicle starts to move.

The determination is performed after a vehicle stops, which is a point in time when an unauthorized operation may be performed on the communication devices, and is performed before the vehicle starts to move, in order to prevent the driver from being exposed to a danger during the travel of the vehicle due to abnormality regarding the communication devices.

An aspect of the present disclosure is directed to a determination device that can be connected to a plurality of communication devices via a bus, and is configured to determine an abnormality regarding the communication devices, including: a transmitting unit that transmits a determination signal at a predetermined voltage to each of the communication devices, wherein each of the communication devices outputs a logical value signal based on a unique voltage threshold, in response to a determination signal that is received, and outputs a response signal to the bus based on the logical value signal, and the determination device further includes a determination unit that determines the abnormality based on the response signal output from each of the communication devices in response to the determination signal.

According to this aspect, the determination device transmits a determination signal at a predetermined voltage to each of the communication devices. Each of the communication devices outputs a logical value signal based on a unique voltage threshold, in response to a determination signal that is received, and outputs the response signal based on the logical value signal. The determination device determines the abnormality based on the response signal transmitted from each of the communication devices.

Since each communication device outputs a response signal that is different from that of other communication devices according to a unique voltage threshold of the communication device, it is possible to determine abnormalities regarding the communication device based on the response signal.

An aspect of the present disclosure is directed to the determination device, further including: a storage unit in which the determination signal, identification data of each of the communication devices, and a voltage pattern of a response signal are stored in association with each other, wherein the determination unit performs the determination based on storage content of the storage unit.

According to this aspect, if a response signal is transmitted from each of the communication devices in response to the determination signal, the determination unit performs the determination by comparing the storage content of the storage unit with the transmitted response signal.

Accordingly, it is possible to accurately determine abnormalities regarding the communication devices, without using secret information.

An aspect of the present disclosure is directed to the determination device, wherein the communication device outputs a response signal containing identification data of the communication device, and the determination unit determines that there is an abnormality, if a voltage pattern of any of the response signals that are transmitted in response to one determination signal does not match the voltage pattern stored in the storage unit in association with the one determination signal.

According to this aspect, for example, if a plurality of response signals are transmitted in response to a predetermined determination signal, a comparison is performed as to whether or not a voltage pattern of any of the response signals does not match a voltage pattern corresponding to the predetermined determination signal, stored in the storage unit.

As a result of this comparison, if a voltage pattern of any response signal does not match a voltage pattern stored in the storage unit, it is possible to determine that there is an abnormality in the communication device that transmitted the non-matching voltage pattern (response signal).

An aspect of the present disclosure is directed to the determination device, wherein the determination unit determines that a communication device from which the non-matching response signal was output has been replaced, if the number of non-matching response signals with the voltage patterns not being matched is less than a threshold.

According to this aspect, if the number of non-matching response signals with the voltage patterns not being matched is less than a threshold, it is determined that there is an abnormality in part of the plurality of communication devices connected to the determination device, and the determination unit determines that a communication device from which the non-matching response signal was output has been replaced.

Accordingly, if there is an abnormality regarding the communication devices, it is possible to clarify the cause of the abnormality.

An aspect of the present disclosure is directed to the determination device, wherein the determination unit determines that part of the communication devices has been detached from the bus or that a new communication device has been connected to the bus, if the number of non-matching response signals with the voltage patterns not being matched is more than or equal to a threshold.

According to this aspect, if the number of non-matching response signals with the voltage patterns not being matched is more than or equal to a threshold, it is determined that there is an abnormality in the whole of the plurality of communication devices connected to the determination device, and the determination unit determines that part of the communication devices has been detached from the bus or that a new communication device has been connected to the bus.

Accordingly, if there is an abnormality regarding the communication devices, it is possible to clarify the cause of the abnormality.

An aspect of the present disclosure is directed to a communication device that can be connected via a bus to an external device that outputs a determination signal at a predetermined voltage, including: a signal output unit that receives the determination signal, and outputs a first logical value signal based on a unique voltage threshold; and a generating unit that generates a second logical value signal based on the first logical value signal, wherein the signal output unit outputs a response signal that is used by the external device to determine an abnormality regarding the communication device, to the bus, based on the second logical value signal.

According to this aspect, the external device transmits a determination signal at a predetermined voltage to a communication device. The communication device outputs a first logical value signal based on a unique voltage threshold, in response to a determination signal that is received, generates a second logical value signal based on the first logical value signal, and outputs the response signal based on the second logical value signal. The external device determines the abnormality based on a response signal transmitted from the communication device.

Since the communication device outputs a response signal that is different from that of other communication devices according to a unique voltage threshold of the communication device, it is possible to determine abnormalities regarding the communication device based on the response signal.

An aspect of the present disclosure is directed to the communication device, wherein the first logical value signal and the second logical value signal are signals indicating the same logical value.

According to this aspect, the first logical value signal and the second logical value signal are signals indicating the same logical value, and the response signal is output based on the second logical value.

Accordingly, it is easy to generate a second logical value signal related to the response signal, without special processing in preparation therefor.

An aspect of the present disclosure is directed to the communication device, wherein the voltage threshold is 0.5 V or more and 0.9 V or less.

According to this aspect, if a predetermined semiconductor element is used as the signal output unit, the threshold that is used to determine a logical value varies within a predetermined range due to issues during manufacture of this semiconductor element. Such a variation is 0.5 V or more and 0.9 V or less, and thus this variation is used as a unique voltage threshold of each of the communication devices.

Accordingly, it is easy to obtain a unique voltage threshold that is different from that of other semiconductor elements.

An aspect of the present disclosure is directed to a determination method that is performed by a determination device that can be connected to a plurality of communication devices via a bus, and is configured to determine an abnormality regarding the communication devices, the method for performing the determination, including: transmitting a determination signal at a predetermined voltage to each of the communication devices; and determining the abnormality based on a response signal output based on a logical value signal output using a unique voltage threshold by each of the communication devices that have received the determination signal.

According to this aspect, the determination device transmits a determination signal at a predetermined voltage to each of the communication devices. Each of the communication devices outputs a logical value signal based on a unique voltage threshold, in response to a determination signal that is received, and outputs the response signal based on the logical value signal. The determination device determines the abnormality based on the response signal transmitted from each of the communication devices.

Since each communication device outputs a response signal that is different from that of other communication devices according to a unique voltage threshold of the communication device, the determination device can determine abnormalities regarding the communication device based on the response signal.

An aspect of the present disclosure is directed to a computer program for causing a computer connected to a plurality of communication devices via a bus, and configured to determine an abnormality regarding the communication devices, to execute processing of transmitting a determination signal at a predetermined voltage to each of the communication devices; receiving a response signal output based on a logical value signal output using a unique voltage threshold by each of the communication devices that have received the determination signal; and determining the abnormality based on the received response signal.

According to this aspect, for example, the determination device transmits a determination signal at a predetermined voltage to each of the communication devices, under the control by a computer included in the determination device. Each of the communication devices outputs a logical value signal based on a unique voltage threshold, in response to a determination signal that is received, and outputs the response signal based on the logical value signal. The determination device determines the abnormality based on the response signal transmitted from each of the communication devices.

Since each communication device outputs a response signal that is different from that of other communication devices according to a unique voltage threshold of the communication device, the determination device can determine abnormalities regarding the communication device based on the response signal.

Hereinafter, the present disclosure will be specifically described with reference to the drawings illustrating embodiments thereof. Below, a vehicle-mounted communication system, a determination device, a communication device, a determination method, and a computer program according to embodiments of the present disclosure will be described with reference to the drawings. Note that the present disclosure is not limited to the configurations described in these embodiments, but is defined by the claims, and is intended to encompass all modifications within the meanings and scope that are equivalent to the claims.

FIG. 1 is a block diagram showing the configuration of a vehicle-mounted communication system 100 according to this embodiment. The vehicle-mounted communication system 100 according to this embodiment includes one vehicle-mounted relay device 10 (determination device) and a plurality of ECUs (electronic control units) 20 to 50 mounted in a vehicle 1. The four ECUs 20 to 50 (communication devices) are connected to a CAN bus B and can exchange frame data (voltage signals) with the vehicle-mounted relay device 10 via the CAN bus B. The CAN bus B is, for example, a twisted pair cable.

In the example shown in the drawings, a case is given as an example in which the vehicle-mounted communication system 100 includes four ECUs 20 to 50, but the vehicle-mounted communication system 100 according to this embodiment is not limited to this, and it is also possible that more than four or less than four ECUs are included.

The ECUs 20 to 50 respectively have transceivers 22, 32, 42, and 52 (signal output units) and control units 21, 31, 41, and 51 (generating units). Since the ECUs 20 to 50 have the same configuration, hereinafter, only the ECU 20 will be described.

The ECU 20 includes the transceiver 22, the control unit 21, and the like.

The transceiver 22 receives a determination signal C (frame data) that is output by the vehicle-mounted relay device 10 via the CAN bus B to the ECUs 20 to 50. In FIG. 1, determination signals C (determination signals) are indicated by the solid arrows.

The transceiver 22 has a unique voltage threshold, determines "0" or "1" (logical value) in response to the received determination signal C based on the voltage threshold, and outputs a signal indicating the logical value "0" or "1" (hereinafter referred to as a logical value signal) to the control unit 21.

More specifically, the transceiver 22 has a semiconductor element (not shown) that is used to determine "0" or "1", where the threshold that is used to determine a logical value varies within a predetermined range due to issues during manufacture of this semiconductor element. Such a variation is 0.5 V or more and 0.9 V or less (which may also be said to be an indefinite range), and thus this variation is used as a unique voltage threshold of each of the ECU 20 (each transceiver 22). That is to say, the voltage threshold of the semiconductor element (the transceiver 22) is any value within the range of 0.5 V or more and 0.9 V or less.

The vehicle-mounted communication system 100 according to this embodiment is not limited to this, and it is also possible that the transceiver 22 uses a semiconductor element whose voltage threshold is set to a specific value.

Figure 2:
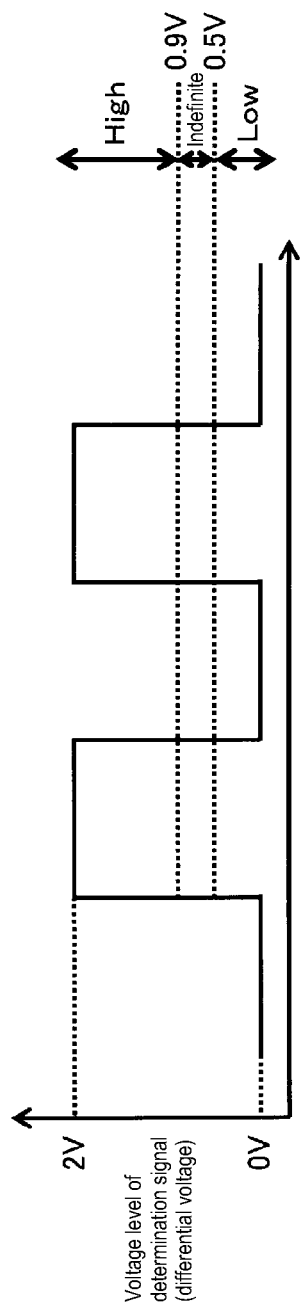
FIG. 2 is a graph showing logical value signal output processing by a transceiver in the vehicle-mounted communication system according to this embodiment.

FIG. 2 is a graph showing logical value signal output processing by the transceiver 22 in the vehicle-mounted communication system 100 according to this embodiment. In FIG. 2, the vertical axis indicates the voltage level of the determination signal C, and the horizontal axis indicates the time. The voltage level is a differential voltage between so-called CAN-High and CAN-Low in the CAN bus B.

As described above, the transceiver 22 has a unique voltage threshold within the indefinite range. Upon receiving a determination signal C with a predetermined voltage pattern, the transceiver 22 determines the logical value as being "0" if the voltage level is higher than the unique voltage threshold, and determines the logical value as "1" if the voltage level is lower than the unique voltage threshold.

Based on the determination result, the transceiver 22 generates a logical value signal, and outputs it to the control unit 21.

In the description above, the logical value determination by the transceiver 22 was described using the differential voltage of a twisted pair cable, but the vehicle-mounted communication system 100 according to this embodiment is not limited to this, and it is also possible to use the voltage of a solid wire.

The control unit 21 receives the logical value signal output by the transceiver 22, and generates a new logical value signal based on the received logical value signal. In the description below, for the sake of ease of description, the logical value signal output by the transceiver 22 is referred to as a first logical value signal L1, and the logical value signal generated by the control unit 21 is referred to as a second logical value signal L2. In FIG. 1, the first logical value signal L1 and the second logical value signal L2 are indicated by the white arrows.

For example, the control unit 21 generates a second logical value signal L2 such that it indicates a logical value that is the same as the logical value indicated by the first logical value signal L1. However, the ECU 20 according to this embodiment is not limited to this. For example, it is also possible that the control unit 21 generates a second logical value signal L2 such that it indicates a logical value that is opposite to the logical value indicated by the first logical value signal L1 or indicates a logical value that is the same as the logical value indicated by a specific portion of the first logical value signal L1.

The second logical value signal L2 generated by the control unit 21 in this manner is output to the transceiver 22.

Upon receiving the second logical value signal L2, the transceiver 22 adds identification data of the communication device to which it belongs, to the received second logical value signal L2, converts the resultant to a response signal (frame data) according to a predetermined communication protocol, and outputs the response signal to the CAN bus B. In FIG. 1, response signals A are indicated by the dashed arrows. The response signal A that has been output is received by the vehicle-mounted relay device 10.

The vehicle-mounted relay device 10 according to this embodiment includes a processing unit 11, a receiving unit 12, a transmitting unit 13, a buffer 14, a storage unit 15, and the like.

For example, the processing unit 11 is constituted using a processor such as a CPU (central processing unit) or an MPU (micro-processing unit), and performs various types of processing by executing various programs stored in the storage unit 15, an unshown ROM (read only memory), or the like. In this embodiment, for example, the processing unit 11 performs processing that determines whether or not there is an abnormality related to an ECU of the vehicle-mounted communication system 100, and, if there is an abnormality, performs processing that determines whether or not the ECU has been replaced, whether or not the ECU has been detached, or whether or not another ECU has been added, and then further performs processing that notifies the user of the determination result, and the like.

The CAN bus B is connected to the vehicle-mounted relay device 10. For example, the vehicle-mounted relay device 10 acquires the response signal A output to the CAN bus B, and performs the above-described determination processing. With this determination processing by the vehicle-mounted relay device 10, it is possible to quickly detect that an ECU has been connected or detached in an unauthorized manner.

In the vehicle-mounted communication system 100 according to this embodiment, a determination signal C with a predetermined voltage pattern is output (e.g., broadcasted) from the vehicle-mounted relay device 10 to the CAN bus B. The output determination signal C is received by the ECUs 20 to 50.

However, as described above, the ECUs 20 to 50 have respectively different unique voltage thresholds, and thus respectively different logical values are determined for the same determination signal C. As a result, the ECUs 20 to 50 output respectively different first logical value signals L1 for the same determination signal C. Accordingly, second logical value signals L2 that are generated in the ECUs 20 to 50 are respectively different, and response signals A that are ultimately output are respectively different as well.

Figure 3:
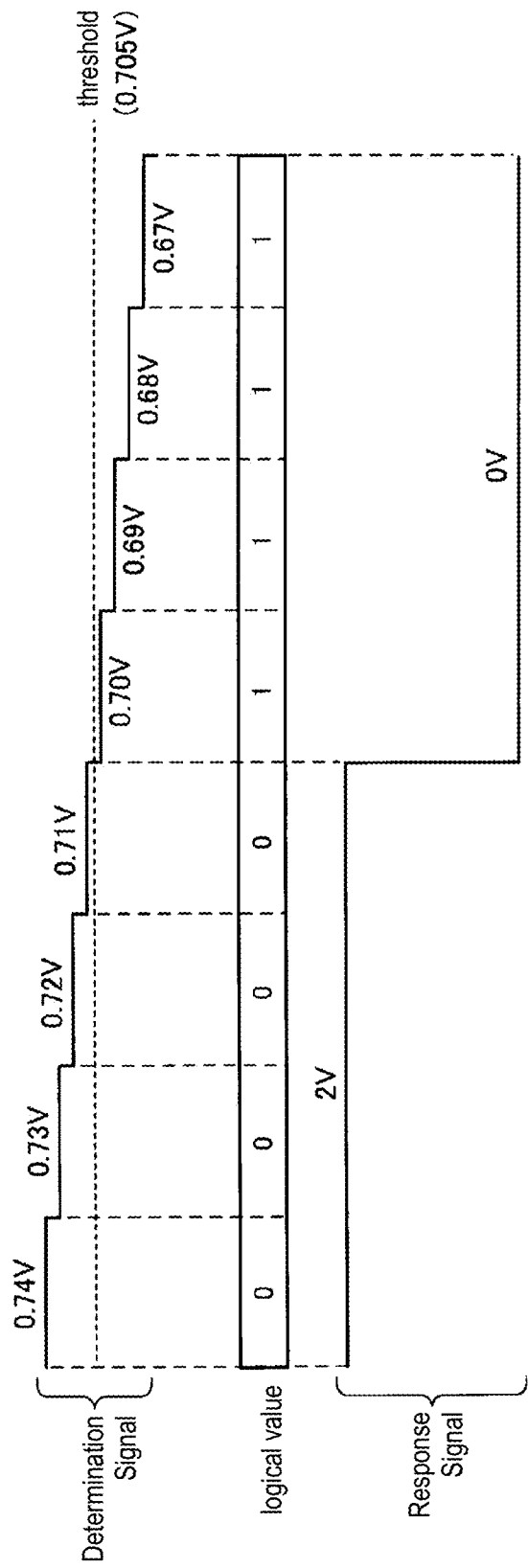
FIG. 3 is an explanatory diagram showing a case in which different response signals are output to the same determination signal in the vehicle-mounted communication system according to this embodiment.
Figure 4:
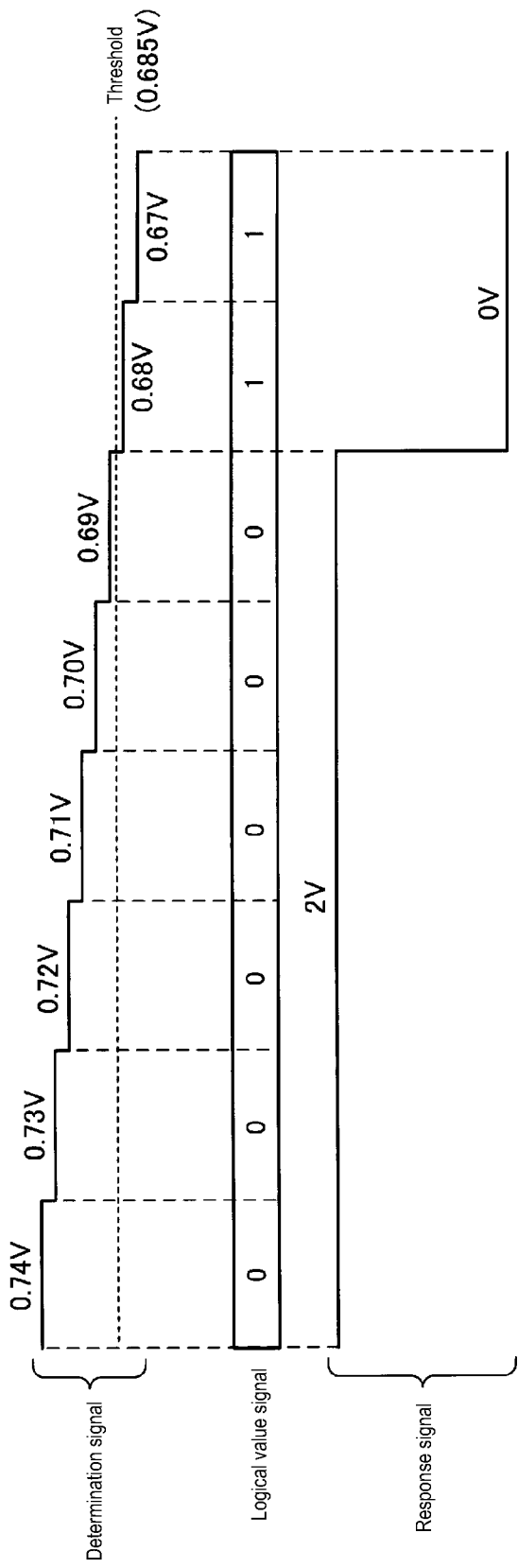
FIG. 4 is an explanatory diagram showing a case in which different response signals are output to the same determination signal in the vehicle-mounted communication system according to this embodiment.

FIGS. 3 and 4 are explanatory diagrams showing a case in which, in the vehicle-mounted communication system 100 according to this embodiment, different response signals A are output for the same determination signal C. For example, FIG. 3 shows a case in which the ECU 20 outputs a response signal A, and FIG. 4 shows a case in which the ECU 30 outputs a response signal A. The ECU 20 has a voltage threshold of 0.705 V, and the ECU 30 has a voltage threshold of 0.685 V. The determination signal C received by the ECU 20 and the ECU 30 is the same signal that varies in a stepwise manner in the range from 0.67 V to 0.74 V.

In the ECU 20 and the ECU 30, the transceiver 22 and the transceiver 32 have different unique voltage thresholds, and thus, even when the same determination signal C is received, respectively different logical values are determined. That is to say, the transceiver 22 determines a voltage level that is lower than 0.705 V, as the logical value "1", and determines a voltage level that is higher than 0.705 V, as the logical value "0". Meanwhile, the transceiver 32 determines a voltage level that is lower than 0.685 V, as the logical value "1", and determines a voltage level that is higher than 0.685 V, as the logical value "0". As a result, for the same determination signal C, the transceiver 22 determines the logical value "0, 0, 0, 0, 1, 1, 1, 1" (FIG. 3), whereas the transceiver 32 determines the logical value "0, 0, 0, 0, 0, 0, 1, 1" (FIG. 4).

Accordingly, the transceiver 22 and the transceiver 32 output respectively different first logical value signals L1 for the same determination signal C, and, accordingly, the control unit 21 and the control unit 31 generate respectively different second logical value signals L2. Thus, as shown in FIGS. 3 and 4, the transceiver 22 and the transceiver 32 output respectively different response signals A.

In the vehicle-mounted relay device 10, the storage unit 15 stores a LUT (look up table) in which the identification data of each the ECUs 20 to 50, and one determination signal C and a predetermined voltage pattern (data body) corresponding to the one determination signal C are associated with each other. Accordingly, if the vehicle-mounted relay device 10 outputs a determination signal C and then receives a response signal A, the vehicle-mounted relay device 10 specifies one voltage pattern in the LUT based on the output determination signal C and identification data contained in the received response signal A, and compares the specified voltage pattern with the voltage pattern (data body) of the received response signal A. Accordingly, the vehicle-mounted relay device 10 determines whether or not there is an abnormality related to an ECU in the vehicle-mounted communication system 100.

For example, the vehicle-mounted relay device 10 determines whether or not there is an abnormality in connection of an ECU in the vehicle-mounted communication system 100. Specifically, conceivable examples thereof include a case in which any of the ECUs 20 to 50 has been detached from the CAN bus B, a case in which any ECU has been replaced in an unauthorized manner, and a case in which another ECU has been connected to the CAN bus B in an unauthorized manner.

In these cases, the vehicle-mounted relay device 10 determines that there is an abnormality in connection of an ECU in the vehicle-mounted communication system 100, or can determine which of the above-described plurality of cases this abnormality matches. The determination processing will be described later in detail.

Furthermore, a signal indicating the on/off state of an IG (ignition) switch S of the vehicle 1 (hereinafter referred to as an IG signal) is given from the IG switch S to the vehicle-mounted relay device 10 according to this embodiment. The vehicle-mounted relay device 10 performs the above-described determination processing, when the vehicle 1 starts to move from the stopped state, for example, when the IG switch S is switched from the off state to the on state.

The receiving unit 12 and the transmitting unit 13 are connected to the CAN bus B, and exchange frame data (the determination signal C and the response signal A) with the ECUs 20 to 50 via the CAN bus B. Furthermore, the receiving unit 12 and the transmitting unit 13 may be constituted using a so-called CAN controller.

In response to an instruction from the processing unit 11, the transmitting unit 13 reads transmission data stored in the buffer 14, and outputs the read data as the determination signal C to the CAN bus B, thereby transmitting the determination signal C to the ECUs 20 to 50.

Furthermore, the receiving unit 12 receives the response signal A output by each the ECUs 20 to 50 to the CAN bus B in response to the received determination signal C through acquisition by sampling, stores the received response signal A in the buffer 14, and notifies the processing unit 11 that it has received the response signal A.

The buffer 14 is constituted using, for example, a memory device such as an SRAM (static random access memory) or a DRAM (dynamic random access memory). The buffer 14 temporarily stores a response signal (frame data) A that was received by the receiving unit 12, a determination signal (frame data) C that is to be transmitted from the transmitting unit 13, and the like.

The storage unit 15 is constituted using, for example, a data-rewritable non-volatile memory device such as an EEPROM (electrically erasable programmable read only memory) or a flash memory. In this embodiment, the storage unit 15 stores the thresholds that are used for the above-described determination processing, a program P for performing the determination processing, and the like.

The program P corresponds to, for example, the processing in the steps in FIGS. 6 and 7, which will be described later, and the determination processing can be realized by the processing unit 11 reading and executing the program P.

Furthermore, the storage unit 15 stores an LUT in advance. In the LUT, the determination signal C, the identification data of each the ECUs 20 to 50, and a predetermined voltage pattern are associated with each other. For the sake of ease of description, in this embodiment, it is assumed that the ECUs 20 to 50 respectively have the identification data (ID) 1 to 4, and the vehicle-mounted relay device 10 outputs three types of determination signals C with different voltage distributions (voltage patterns) to the CAN bus B. The ECUs 20 to 50 output different response signals A to the CAN bus B for each type of determination signal C.

The vehicle-mounted relay device 10 according to this embodiment is not limited to this, and it is also possible that three or more types of determination signals C can be output.

FIG. 5 is a conceptual diagram conceptually showing a LUT stored in the storage unit 15 in the vehicle-mounted communication system 100 according to this embodiment. In the LUT, the identification data of each the ECUs 20 to 50 (ECU ID), each type of determination signal C, and a predetermined voltage pattern are associated with each other.

That is to say, in the LUT, the response signal A (voltage pattern) that is to be output by each the ECUs 20 to 50 is stored in association with each type of determination signal C.

For example, the ECU 20 is associated with the voltage pattern "X11" if the type of the determination signal C is "T1", is associated with the voltage pattern "X12" if the type of the determination signal C is "T2", and is associated with the voltage pattern"X13" if the type of the determination signal C is "T3".

In FIG. 5, the type of the determination signal C is indicated as "T1", "T2", and "T3", but it is actually a series of logical values indicating voltage patterns (data bodies) of the respective types of determination signals C. Also, in FIG. 5, the voltage pattern is indicated as "X11", "X12", . . . , but it is actually a series of logical values indicating voltage patterns (data bodies).

Figure 6:
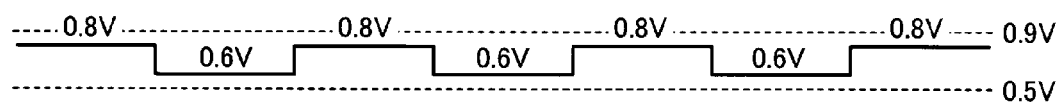
FIG. 6 is an exemplary diagram showing an example of the types (voltage patterns) of determination signals that are output by a vehicle-mounted relay device in the vehicle-mounted communication system according to this embodiment.
Figure 6:
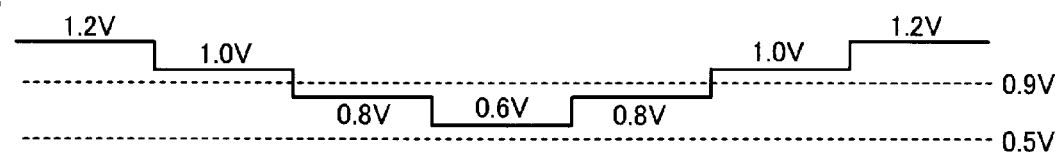
Figure 6:
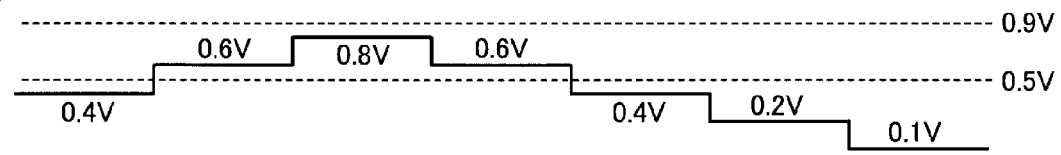
Figure 6:
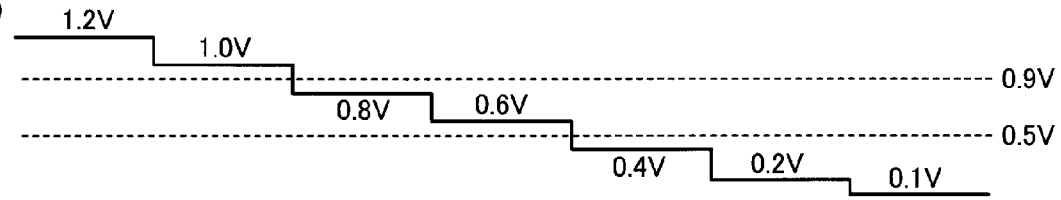
Figure 6:
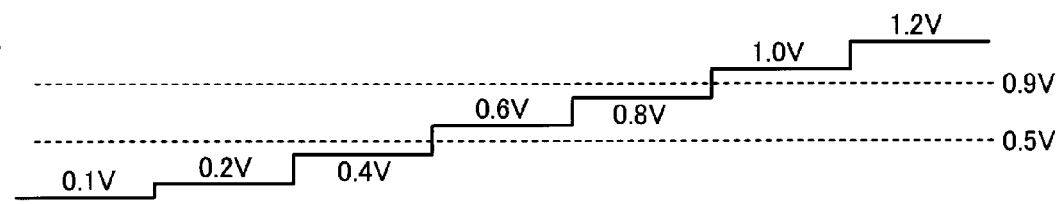

FIG. 6 is an exemplary diagram showing an example of the types (voltage patterns) of determination signals C that are output by the vehicle-mounted relay device 10 in the vehicle-mounted communication system 100 according to this embodiment.

The determination signal C contains a voltage that is 0.5 V or more and 0.9 V or less. For example, the determination signal C may be entirely included in the range of 0.5 V or more and 0.9 V or less as shown in FIG. 6A, may be included only partially in the range of 0.5 V or more and 0.9 V or less as shown in FIGS. 6B to 6E.

Furthermore, the voltage of the determination signal C may vary within the range of 0.5 V or more and 0.9 V or less as shown in FIG. 6A, or may be constant.

Furthermore, the determination signal C may partially contain a voltage that is 0.5 V or more and 0.9 V or less, and further contain a voltage that is higher than 0.9 V. For example, as shown in FIGS. 6B, 6D, and 6E, the determination signal C may contain a voltage that is in the range of 0.5 V or more and 0.9 V or less in the middle, and a voltage that is higher than 0.9 V at an end.

Furthermore, the determination signal C may partially contain a voltage that is 0.5 V or more and 0.9 V or less, and may further contain a voltage that is lower than 0.5 V. For example, as shown in FIGS. 6C, 6D, and 6E, the determination signal C may contain a voltage that is in the range of 0.5 V or more and 0.9 V or less in the middle, and a voltage that is lower than 0.5 V at an end.

Furthermore, the determination signal C may partially contain a voltage that is 0.5 V or more and 0.9 V or less, and may further contain a voltage that is higher than 0.9 V and a voltage that is lower than 0.5 V. For example, as shown in FIGS. 6D and 6E, the determination signal C may contain a voltage that is in the range of 0.5 V or more and 0.9 V or less in the middle, a voltage that is lower than 0.5 V at one end, and a voltage that is higher than 0.9 V at the other end.

FIGS. 6A to 6E show an example of five types of determination signals C, but the vehicle-mounted communication system 100 according to this embodiment is not limited to this, and it is also possible that the determination signals C are constituted by a combination of any two types shown in FIGS. 6A to 6E.

Figure 7:
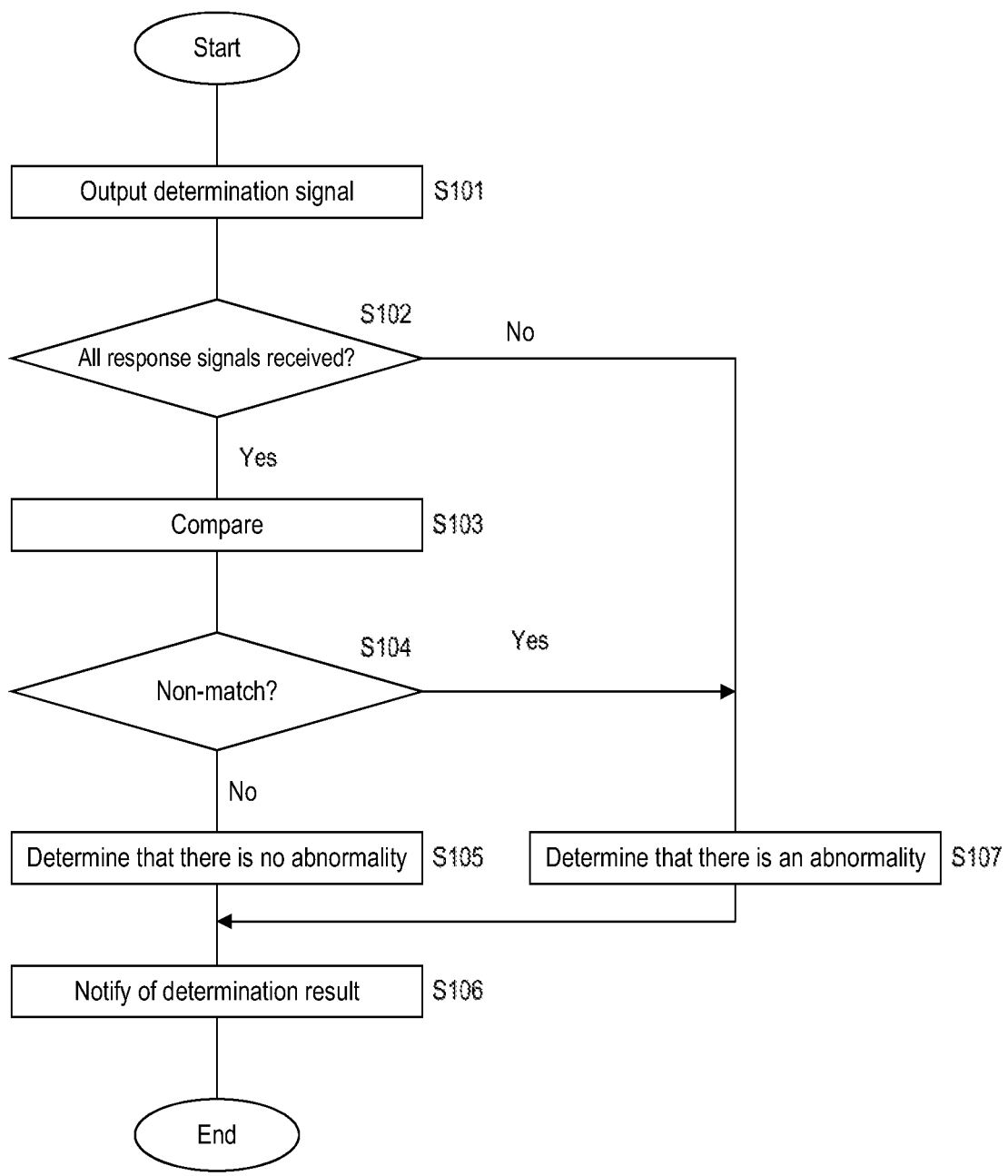
FIG. 7 is a flowchart illustrating an example of determination processing that is performed by the vehicle-mounted relay device in the vehicle-mounted communication system according to this embodiment.

FIG. 7 is a flowchart illustrating an example of determination processing that is performed by the vehicle-mounted relay device 10 in the vehicle-mounted communication system 100 according to this embodiment.

In the vehicle-mounted relay device 10, the transmitting unit 13 broadcasts a determination signal C to the CAN bus B (step S101). Hereinafter, for the sake of ease of description, it is assumed that the transmitting unit 13 outputs a determination signal C of the type "T1" to the CAN bus B.

Next, the processing unit 11 determines whether or not response signals A have been received from all of the ECUs 20 to 50 (step S102). For example, the processing unit 11 performs this determination by counting the number of response signals A that have been received.

For example, if the processing unit 11 determines that response signals A have not been received from all of the ECUs 20 to 50 even after a predetermined period of time (step S102: NO), that is, if any of the ECUs 20 to 50 has been detached from the CAN bus B, response signals A have not been received from all of the ECUs 20 to 50, and thus the processing unit 11 advances the procedure to step S107.

Furthermore, if the processing unit 11 determines that response signals A have been received from all of the ECUs 20 to 50 (step S102: YES), the processing unit 11 compares the response signals A (voltage patterns) received from the ECUs 20 to 50 with the voltage patterns in the LUT (step S103).

Specifically, upon receiving one response signal A (frame data), the processing unit 11 specifies one corresponding voltage pattern from the LUT, based on the identification data contained in the one response signal A and the type of the determination signal C ("T1") transmitted from the communication device. The processing unit 11 compares the specified voltage pattern with the voltage pattern of the one response signal A (data body). The processing unit 11 performs the comparison processing on the response signal A output from each the ECUs 20 to 50.

The processing unit 11 determines whether or not there is any response signal A that does not match the corresponding voltage pattern in the LUT (hereinafter referred to as a non-matching response signal A), out of all response signals A that have been received, based on a result of the comparison processing (step S104).

For example, conceivable examples thereof include a case in which any of the ECUs 20 to 50 has been replaced in an unauthorized manner. In this case, the response signal A from the replaced ECU does not match the corresponding voltage pattern in the LUT, and thus the response signal A is determined as being a non-matching response signal A.

Conceivable examples thereof further include a case in which any of the ECUs 20 to 50 has been detached from the CAN bus B, and a case in which an unauthorized ECU has been newly connected to the CAN bus B in addition to the ECUs 20 to 50. In these cases, the load of the CAN bus B changes, and thus the determination signal C that is output by the vehicle-mounted relay device 10 is changed. As a result, none of the response signals A output from the ECUs 20 to 50 matches the corresponding voltage patterns in the LUT.

Upon determining that there is no response signal A that does not match the corresponding voltage pattern in the LUT, out of all response signals A that have been received (step S104: NO), the processing unit 11 determines that there is no abnormality in connection of the ECUs in the vehicle-mounted communication system 100 (step S105).

Next, the processing unit 11 notifies the user of the determination result in step S105 by displaying it on a display unit (not shown) of the vehicle 1 or by using sound or voice through a speaker (not shown) of the vehicle 1 (step S106).

On the other hand, upon determining that there is any response signal A that does not match the corresponding voltage pattern in the LUT, out of all response signals A that have been received (step S104: YES) or determining as described above that response signals A have not been received from all of the ECUs 20 to 50 even after a predetermined period of time (step S102: NO), the processing unit 11 determines that there is an abnormality in connection of an ECU in the vehicle-mounted communication system 100 (step S107).

Furthermore, the processing unit 11 notifies the user of the determination result in step S107 as described above (step S106).

In the description above, a case was described as an example in which the vehicle-mounted relay device 10 broadcasts a determination signal C to the ECUs 20 to 50, but the vehicle-mounted communication system 100 according to this embodiment is not limited to this. For example, it is also possible that the determination signal C is output to a designated address by providing it with address data. In this case, it is also possible to determine abnormalities in each of the ECUs 20 to 50.

Specifically, if the vehicle-mounted relay device 10 outputs the determination signal C that is to be addressed to any of the ECUs 20 to 50, the ECUs 20 to 50 once receive the determination signal C but discard the determination signal C if it is not addressed to the communication device. Accordingly, the vehicle-mounted relay device 10 can receive only the response signal A from an ECU designated with the address (hereinafter referred to as a designated ECU).

The vehicle-mounted relay device 10 can compare the received response signal A (voltage pattern) with the voltage pattern in the LUT, and determine whether or not there is an abnormality in connection of the designated ECU in the vehicle-mounted communication system 100, based on a result of the comparison processing.

Note that it is also possible to adopt a configuration in which, if the response signal A is not received even after a predetermined period of time after the determination signal C is output, it is determined that the designated ECU has been detached from the CAN bus B.

With this configuration, when any of the ECUs 20 to 50 has been replaced in an unauthorized manner, when part of the ECUs 20 to 50 has been detached from the CAN bus B, or when an unauthorized ECU other than the ECUs 20 to 50 has been connected to the CAN bus B, the vehicle-mounted communication system 100 according to this embodiment can detect it as an abnormality, and quickly notify the user of the abnormality.

Modified Examples

Figure 8:
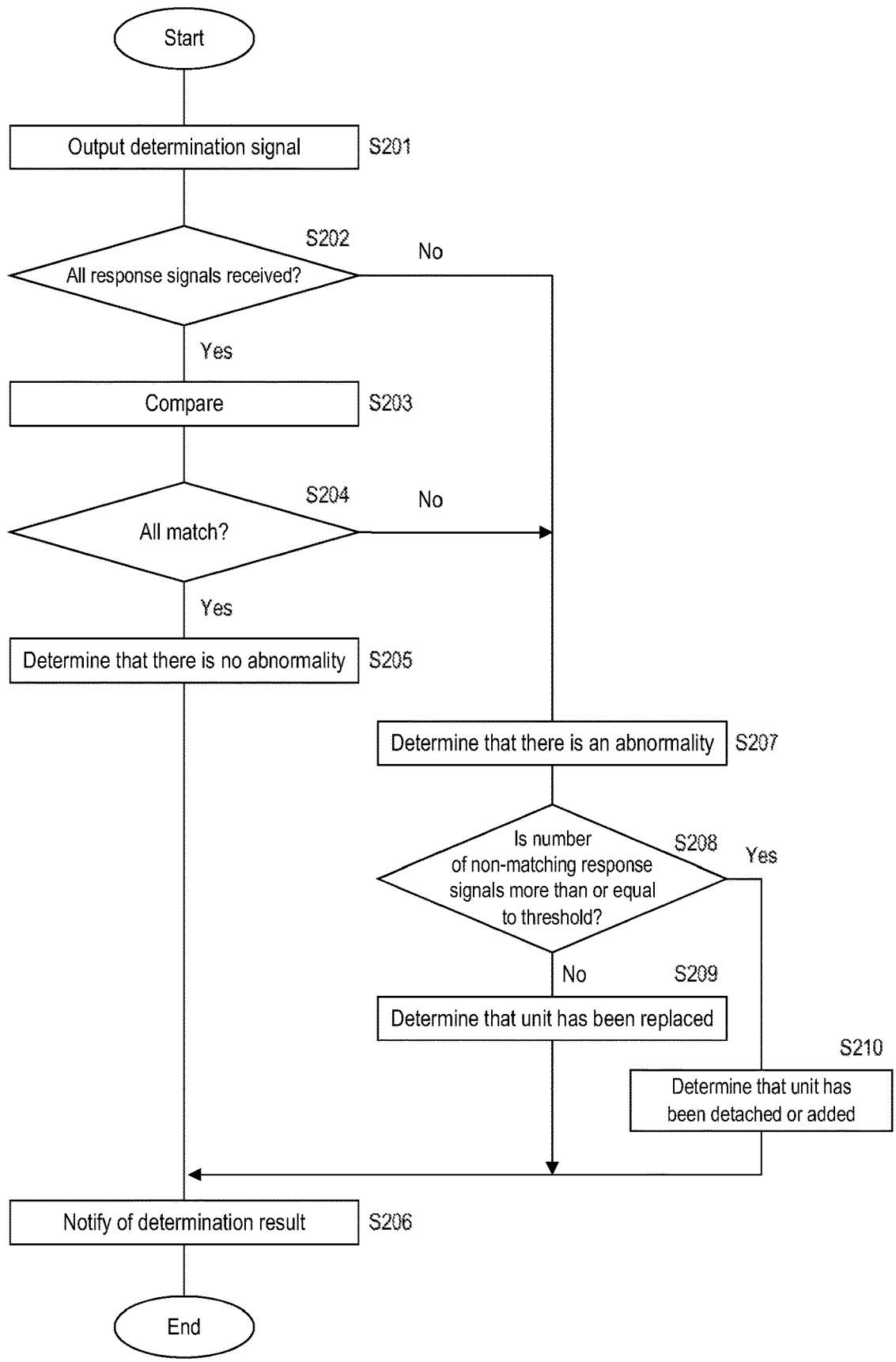
FIG. 8 is a flowchart illustrating a modified example of the determination processing that is performed by the vehicle-mounted relay device in the vehicle-mounted communication system according to this embodiment.

FIG. 8 is a flowchart illustrating a modified example of the determination processing that is performed by the vehicle-mounted relay device 10 in the vehicle-mounted communication system 100 according to this embodiment.

In FIG. 8, the processing in steps S201 to S203 is the same as that in steps S101 to S103 in FIG. 7, and thus a detailed description thereof has been omitted.

The processing unit 11 determines whether or not all response signals A that have been received match the corresponding voltage patterns in the LUT, based on a result of the processing in step S203 (step S204).

If the processing unit 11 determines that all response signals A that have been received match the corresponding voltage patterns in the LUT (step S204: YES), that is, if there is no non-matching response signal A, the processing unit 11 determines that there is no abnormality in connection of the ECUs in the vehicle-mounted communication system 100 (step S205).

Furthermore, the processing unit 11 notifies the user of the determination result in step S205 as described above (step S206).

On the other hand, upon determining that there is at least one non-matching response signal A, and not all response signals A that have been received match the corresponding voltage patterns (step S204: NO), or that response signals A have not been received from all of the ECUs 20 to 50 even after a predetermined period of time (step S202: NO), the processing unit 11 determines that there is an abnormality in connection of an ECU in the vehicle-mounted communication system 100 (step S207).

If it is determined that there is an abnormality in connection of an ECU in the vehicle-mounted communication system 100 in this manner, the processing unit 11 determines, using a threshold stored in the storage unit 15, whether or not the number of non-matching response signals A is more than or equal to the threshold, based on a result of the processing (comparison processing) in step S204 (step S208). The threshold is, for example, is half the total number of ECUs.

As described above, if any of the ECUs 20 to 50 has been detached from the CAN bus B, or if an unauthorized ECU has been newly connected to the CAN bus B in addition to the ECUs 20 to 50, the determination signals C that are output by the vehicle-mounted relay device 10 are changed. As a result, all response signals A output from the ECUs 20 to 50 are non-matching response signals A. That is to say, all response signals A that have been received are non-matching response signals A.

Meanwhile, if any of the ECUs 20 to 50 has been replaced in an unauthorized manner, only the response signal A from the replaced ECU is a non-matching response signal A. That is to say, part of the received response signals A is a non-matching response signal A.

Accordingly, upon determining that the number of non-matching response signals A is less than the threshold (step S208: NO), the processing unit 11 determines that any of the ECUs 20 to 50 has been replaced (step S209). Furthermore, the processing unit 11 notifies the user of the determination result in step S209 as described above (step S206).

Upon determining that the number of non-matching response signals A is more than or equal to the threshold (step S208: YES), the processing unit 11 determines that any of the ECUs 20 to 50 has been detached from the CAN bus B or that another ECU has been further connected to the CAN bus B in addition to the ECUs 20 to 50 (step S210). Furthermore, the processing unit 11 notifies the user of the determination result in step S210 as described above (step S206).

With this configuration, the vehicle-mounted communication system 100 according to this embodiment can quickly detect abnormalities related to an ECU in the communication system due to any of the ECUs 20 to 50 being replaced in an unauthorized manner, part of the ECUs 20 to 50 being detached from the CAN bus B, or an unauthorized ECU other than the ECUs 20 to 50 being connected to the CAN bus B, and can find the cause and notifies the user of it.

It is also possible that the processing unit 11 and the control unit 21 described above are configured by hardware logic, or in software by a CPU executing a predetermined program.

The disclosed embodiments are to be considered as illustrative and non-limiting in all aspects. The scope of the present disclosure is indicated not by the above-stated meanings but by the scope of claims, and is intended to include all modifications that are within the meanings and the scope that are equivalent to those of the scope of claims.

The invention claimed is:

1. A vehicle-mounted communication system in which a plurality of communication devices and a determination device for determining an abnormality regarding the communication devices are connected to each other via a bus, wherein the determination device includes:
a transmitting unit that transmits a determination signal at a predetermined voltage to each of the communication devices; and
a determination unit that determines the abnormality based on a response signal transmitted from each of the communication devices in response to the determination signal,
each of the communication devices includes:
a signal output unit that outputs a first logical value signal based on a predetermined voltage threshold, in response to a determination signal that is received; and
a generating unit that generates a second logical value signal based on the first logical value signal, and
the signal output unit outputs the response signal to the bus based on the second logical value signal.

2. The vehicle-mounted communication system according to claim 1, wherein the first logical value signal and the second logical value signal are signals indicating the same logical value.

3. The vehicle-mounted communication system according to claim 1, further comprising
a storage unit in which the determination signal, identification data of each of the communication devices, and a predetermined voltage pattern are stored in association with each other,
wherein the determination unit performs the determination based on storage content of the storage unit.

4. The vehicle-mounted communication system according to claim 3,
wherein the signal output unit outputs a response signal containing identification data of the communication device to which it belongs, and
the determination unit determines that there is an abnormality, if a voltage pattern of any of the response signals that are transmitted in response to one determination signal does not match the voltage pattern stored in the storage unit in association with the one determination signal.

5. The vehicle-mounted communication system according to claim 4, wherein the determination unit determines that a communication device from which the non-matching response signal was output has been replaced, if the number of non-matching response signals with the voltage patterns not being matched is less than a threshold.

6. The vehicle-mounted communication system according to claim 4, wherein the determination unit determines that part of the communication devices has been detached from the bus or that a new communication device has been connected to the bus, if the number of non-matching response signals with the voltage patterns not being matched is more than or equal to a threshold.

7. The vehicle-mounted communication system according to claim 1,
wherein the predetermined voltage threshold is 0.5 V or more and 0.9 V or less, and
the determination signal contains a voltage that is 0.5 V or more and 0.9 V or less.

8. The vehicle-mounted communication system according to claim 7, wherein the determination signal further contains a voltage that is higher than 0.9 V.

9. The vehicle-mounted communication system according to claim 7, wherein the determination signal further contains a voltage that is lower than 0.5 V.

10. The vehicle-mounted communication system according to claim 7, wherein the determination signal further contains a voltage that is higher than 0.9 V and a voltage that is lower than 0.5 V.

11. The vehicle-mounted communication system according to claim 1, wherein the determination unit performs the determination after a vehicle stops and before the vehicle starts to move.

12. A determination device that for use in an automotive vehicle having a plurality of communication devices via a bus, and the determination device connected to the plurality of communication devices via the bus, the determination device configured to determine an abnormality regarding the communication devices, the determination device comprising:
a transmitting unit that transmits a determination signal at a predetermined voltage to each of the communication devices,
wherein each of the communication devices outputs a logical value signal based on a predetermined voltage threshold, in response to a determination signal that is received, and outputs a response signal to the bus based on the logical value signal, and
the determination device further comprises a determination unit that determines the abnormality based on the response signal output from each of the communication devices in response to the determination signal.

13. The determination device according to claim 12, further comprising:
a storage unit in which the determination signal, identification data of each of the communication devices, and a voltage pattern of a response signal are stored in association with each other,
wherein the determination unit performs the determination based on storage content of the storage unit.

14. The determination device according to claim 13,
wherein the communication device outputs a response signal containing identification data of the communication device, and
the determination unit determines that there is an abnormality, if a voltage pattern of any of the response signals that are transmitted in response to one determination signal does not match the voltage pattern stored in the storage unit in association with the one determination signal.

15. The determination device according to claim 14, wherein the determination unit determines that a communication device from which the non-matching response signal was output has been replaced, if the number of non-matching response signals with the voltage patterns not being matched is less than a threshold.

16. The determination device according to claim 14, wherein the determination unit determines that part of the communication devices has been detached from the bus or that a new communication device has been connected to the bus, if the number of non-matching response signals with the voltage patterns not being matched is more than or equal to a threshold.

17. A computer program product disposed in a device connected to a plurality of communication devices via a bus, the computer program product comprising a non-transitory, machine-readable medium storing instructions which, when executed by at least one programmable processor, causes at least one programmable processor to determine an abnormality regarding the communication devices, the at least one programmable processer further configured to execute steps of:
transmitting a determination signal at a predetermined voltage to each of the communication devices;
receiving a response signal output based on a logical value signal output using a predetermined voltage threshold by each of the communication devices that have received the determination signal; and
determining the abnormality based on the received response signal.

* * * * *